Jan. 31, 1967 HARUO SHIKI 3,302,115

CONTROL SIGNAL GENERATOR FOR DIVERSITY RECEPTION

Filed Aug. 27, 1963

Inventor
H. Shiki
By [signature]
Attorney 3,302,115
Patented Jan. 31, 1967

3,302,115

CONTROL SIGNAL GENERATOR FOR DIVERSITY RECEPTION

Haruo Shiki, Minato-ku, Tokyo, Japan, assignor to Nippon Electric Company, Limited, Tokyo, Japan, a corporation of Japan Filed Aug. 27, 1963, Ser. No. 304,850
Claims priority, application Japan, Aug. 29, 1962, 37/36,945
3 Claims. (Cl. 325—304)

This invention relates to a control signal generator for diversity reception and, more particularly to that for diversity reception of a frequency-modulated wave.

Irrespective of the kinds of the diversity, such as frequency diversity, space diversity, or polarization diversity, a diversity receiver comprises means for generating a plurality of control signals in response to signal-to-noise ratios (*S/N* ratios) of a plurality of signals received through a plurality of transmission lines, respectively, and a signal combining means, such as a signal combiner or a signal switching device, for producing an output signal, under control of the control signals, from the received signals, from which such defects of reception as may have been caused by fading are removed as far as possible. A signal combiner is generally so composed as to respond to the control signals to produce the output signal by suppressing that signal which has been received through the transmission path of the worst *S/N* ratio and by augmenting that signal which has been received through the transmission path having the best *S/N* ratio. Whereas, a signal switching device is so composed as to selectively take out as the output signal only the signal received through the transmission path of the best *S/N* ratio. Whether a signal combiner or a signal switching device is used, the cotnrol signal generator must faithfully respond to the *S/N* ratios of the received signals.

A conventional control signal generator comprises circuits assigned to the respective transmission lines to produce control signals in compliance with the *S/N* ratios of the respective transmission lines. Therefore, amplification characteristics of the circuits must strictly be identical with one another. A control signal generator in a diversity receiver for combining the signals of a frequency-modulated wave in the video band must comprise amplifiers for logarithmically amplifying noise components. It is, however, very difficult to obtain two or more logarithmic amplifiers of strictly identical characteristics. Furthermore, it is still more difficult to always keep the characteristics of two or more logarithmic amplifiers in strict identity because the characteristics of a logarithmic amplifier vary with change in the characteristics of the component elements, such as vacuum tubes or transistors, and upon replacement of such elements. Inequality of the characteristics of the logarithmic amplifiers results in unequal reference values for the obtained control signals and in miscontrol of the signal combining means, or possible misoperation of a signal combiner or, more especially a signal switching device. This is particularly so when the *S/N* ratios of signals received over some of the transmission paths are approximately equal to one another. Specifically, use of a signal switching device as the signal combining means will then be liable to selectively lead to the output thereof the signal which has been received through an undesirable transmission path.

In addition, increase in the levels of the received signals would lead a signal switching device, if such is in use, into a state of "no switch" described in "Bell System Technical Journal," 1960, July issue, page 848 with reference to FIGURES 2 and 3, or a state wherein the switching device would not necessarily select the signal of beat *S/N* ratio. In the state of "no switch," diversity reception is suspended, only one of the received signals participates in reception, and consequently there is no improvement of the *S/N* ratio by the diversity reception. Falling into "no switch" must therefore be avoided as far as possible irrespective of the received signal levels.

The object of the invention is, therefore, to provide a control signal generator for generating control signals which faithfully represent the receiver signals which have the best *S/N* ratio regardless of the amplitude levels of the plurality of received signals and thereby to improve the quality of diversity reception.

In contrast to a conventional control signal generator wherein a circuit arrangement is provided for each of the transmission lines, a single control signal extracting circuit common to all the transmission lines is provided, in accordance with the invention. An input and an output switch are provided on the input and the output sides of the extracting circuit, respectively, together with means for synchronously operating the switches to extract in a time division manner a sequence of control signals from the received signals.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
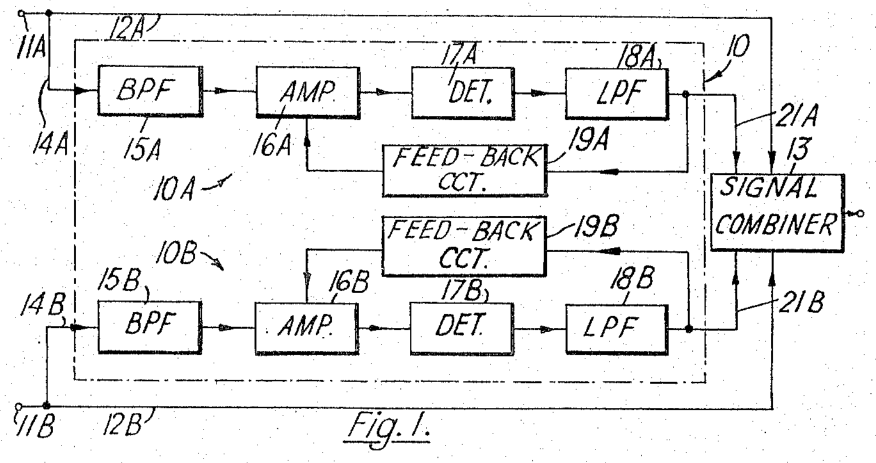
FIG. 1 is a block diagram of the main part of a diversity receiver including a conventional control signal generator.

Referring to FIG. 1 before explaining a control signal generator of the invention, the main part of a diversity receiver for a frequency-modulated wave having a conventional control signal generator 10 is so arranged that two signals which are obtained by demodulating two received signal waves at demodulating means, not shown, may be supplied thereto through input terminals 11A and 11B, respectively. The supplied signals may be either completely demodulated video signals or intermediate-frequency signals. If they are intermediate-frequency signals, some modifications in the arrangement are necessary, which are to be later described. If a signal combiner is adopted, a phase shifter is necessary both in the cases of video signals and the intermediate-frequency signals, for bringing correct coincidence between the phase of the supplied signals. However such phase shifter will not be explained in this specification because it has nothing to do with the subject matter of the invention.

One of the supplied signals is led from the input terminal 11A, on one hand, through a connection 12A to a signal combining means 13 and, on the other hand, through an input connection 14A to one side of the generator 10. Likewise, the other supplied signal is applied from the input terminal 11B, on one hand, through a connection 12B to the combining means 13 and, on the other hand, through an input connection 14B to the other side of the generator 10. The control signal generator 10 consists of two similar control signal generator portions 10A and 10B corresponding to the connections 12A and 12B, respectively. One control signal generator portion 10A comprises a band-pass filter 15A connected to the input connection 14A to extract noise components from the supplied signal, a noise amplifier 16A connected to the filter 15A, a detector 17A for detecting the output of the amplifier 16A, a low-pass filter 18A connected to the detector 17A, and a feedback circuit 19A for feeding a portion of the output power of the low-pass filter 18A to the amplifier 16A. In diversity reception of a frequency-modulated wave wherein the levels of the received signals are above a threshold level, variation caused in the received signal levels by fading will appear only as variation of noise levels in the supplied signals of constant levels. It is therefore possible to monitor the *S/N* ratios of the received signals by extracting and monitoring only level variations of noise components in the supplied signals. The noise component which is the output power of the band-pass filter 15A is amplified in the manner to be later described and envelope-detected by the detector 17A and then applied through the low-pass filter 18A and an output connection 21A to the signal combining means 13 as one input of the control signals. A portion of the output power of the low-pass filter 18A is fed back through the feedback circuit 19A to the noise amplifier 16A to automatically control the gain of the amplifier 16A and to restrict the output power within a predetermined range irrespective of any large variation of the noise contained in the supplied signal or so as to provide the noise amplifier 16A with logarithmic amplification characteristics. The time constant of the feedback circuit 19A for automatic gain control is so selected as to be able to respond to the presumable shortest period of fading of the received signal wave.

The other control signal generator portion 10B comprises, in correspondence to the constructional elements of the above-explained portion 10A, a filter 15B connected to input connection 14B, a noise amplifier 16B, a detector 17B, a low-pass filter 18B, and a feedback circuit 19B. The output power of the low-pass filter 18B is applied through an output connection 21B to the other control signal input terminal of the signal combining means 13.

As will be seen from the construction of the control signal generator 10, it is mandatory in order to properly combine the supplied signals in the signal combining means 13, that the amplification characteristics of the generator portions 10A and 10B may strictly be identical with each other. It is, however, very difficult to obtain two amplifiers 16A and 16B of strictly identical logarithmic amplification characteristics. It is to be noted here that in a linear adder or a ratio squarer combiner, frequently used as a signal combiner, improvement of the *S/N* ratios of the two supplied signals by signal combining is the most remarkable when the *S/N* ratios are substantially equal to each other. Also, it is well known that in a signal switching device, which is another form of the signal combining means, special care must be taken of the switching operation in case the *S/N* ratios are approximately equal to each other. Inasmuch as it is next to impossible to maintain the characteristics of the control signal generator portions 10A and 10B in strict coincidence with each other and stable for a long period, voltages of the control signals will differ from each other even if the noise levels of the supplied signals may be substantially identical with each other. Therefore, use of a linear adder or a ratio squarer combiner as the signal combining means would not result in the most advantageous signal combining action in a range wherein the improvement of the *S/N* ratios is the most diverse, while use of a signal switching device would not result in effective selection of that one of the supplied signals which has been received through the transmission path of best *S/N* ratio.

In a microwave line-of-sight multichannel communication, *S/N* ratios of the signals received through two transmission paths are generally at similar values most of the time. A control signal generator must therefore produce control signals in correct response to such substantially similar *S/N* ratios. Conventional control signal generators do not fulfill such requirements.

Figure 2:
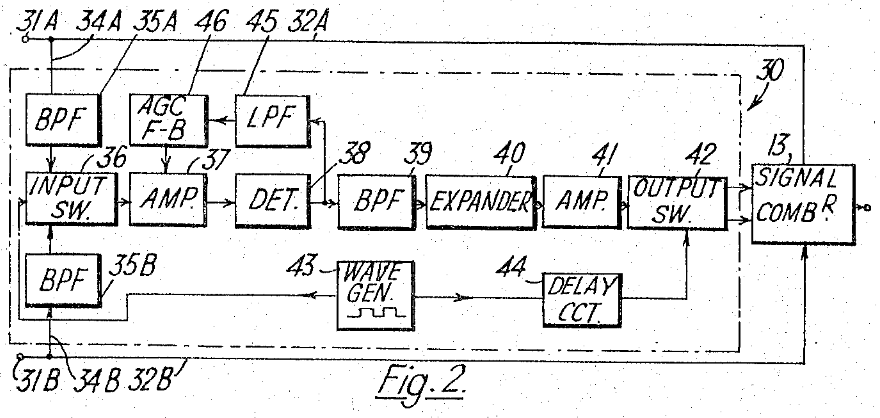
FIG. 2 is a block diagram of the main part of a diversity receiver including a control signal generator which is an embodiment of the invention.

Referring to FIG. 2, the main part of a diversity receiver including a control signal generator 30 of the invention shown therein, is so composed that one of the supplied signals, such as demodulated video signals, may be led from an input terminal 31A, on one hand, through a connection 32A to one of the input terminals of the signal combining means 13 and, on the other hand, through an input connection 34A to the control signal generator 30. The other supplied signal is likewise led from an input terminal 31B through another connection 32B to combiner 13 through another input connection 34B to the generator 30.

The control signal generator 30 comprises band-pass filters 35A and 35B connected to the input connections 34A and 34B, respectively, an input switch 36 connected to both the filters 35A and 35B so as to alternatingly derive the output powers of such filters 35A and 35B under control of a rectangular wave generated by a rectangular wave generator 43 to be later described, a noise amplifier 37 connected to the switch 36, a detector 38, another band-pass filter 39, a nonlinear circuit or a signal expander 40 for expanding the output waveform of the filter 39, an auxiliary amplifier 41, an output switch 42 composed of a directional rectifier, a rectangular wave generator 43 for generating a rectangular wave for controlling the switching action of the switches 36 and 42, and a delay circuit 44 interposed between the output of the rectangular wave generator 43 and the control input of the output switch 42. The output power of the detector 38 is, on one hand, led to the band-pass filter 39 and, on the other hand, fed back through a low-pass filter 45 for eliminating a component of the recurrence frequency of the rectangular wave and an automatic gain control feedback circuit 46 to the noise amplifier 37 to control the gain of the amplifier 37. The overall time constant of the low-pass filter 45 and the feedback circuit 46 contained in the feedback loop is selected sufficiently larger than the recurring period of the rectangular wave to eliminate it but sufficiently short to follow even the shortest foreseen variation of fading of the received waves.

The input switch 36 may be an electronic switch or an electromagnetic relay for alternately switching the input powers from filters 35A and 35B to its output side under control of the rectangular wave generated by the rectangular wave generator 43. The switch 36 is illustrated merely by a block because such will be familiar to those skilled in the art.

Inasmuch as the switching action of the switch 36 corresponds to sampling of the envelope of the input noise components, the repetition frequency of the rectangular wave for controlling the operation of the switch must be smaller than a half of the frequency of the minimum frequency component contained in the input signals. The output switch 42 whose control input power is the rectangular wave delayed in the delay circuit 44, switches the output of the auxiliary amplifier 41 to two control signal input terminals of the signal combining means 13 in a time division manner. A directional rectifier is preferred as the switch 42 because the directional rectifier comprises at its output end a CR type low-pass filter which delivers to the two control signal input terminals of the signal combining means 13 substantially continuous control signals in spite of the fact that the noise components in the respective transmission lines have become discontinuous because of the switching action of the input and the output switches 36 and 42. The time constant of the low-pass filter contained in the directional rectifier is so selected as to be sufficiently greater than the recurring period of the rectangular wave but short enough to follow the variation of the input signals.

It will be apparent from the construction of the control signal generator 30 of the invention wherein a control signal extracting circuit for deriving the control signals for the signal combining means 13 is provided in common for two signal paths, that the arrangement is equivalent in effect to provision of two control signal extracting circuits of identical characteristics for extracting the noise levels from the signals received through the respective transmission paths. Accordingly it is possible to completely eliminate the defects of the conventional control signal generator resulting from variations in the identity between the characteristics of the two signal paths in the generator. The merits of the control signal generator of the invention are augmented with increase in the number of the transmission paths.

Also, the control signal generator of the invention wherein the gain of the noise amplifier 37 is automatically controlled in accordance with the mean value of the noise levels of the signals received through the respective transmission paths, or in such a manner that the mean value of the two noise levels at the output terminal of the amplifier 37 may be always constant, can generate control signals which faithfully represent the larger of the two noise levels even though the two levels may be both large or both small. If the detection characteristics of the detector 38 are ideally linear, peak-to-peak value of the output voltage of the band-pass filter 39 is proportional to the ratio of the difference in the absolute values to the sum of the two noise levels $N_A$ and $N_B$ in the band-pass filters 35A and 35B, or $(|N_A-N_B|)/(N_A+N_B)$. As a result, the peak-to-peak value will not exceed a certain value even if the difference between the two noise levels $N_A$ and $N_B$ may be enormous. In consequence of such automatic gain control, variation of the noise levels appears in the output power of the detector 38 not as the variation of their absolute values but in a compressed form. If a signal combiner is used as the signal combining means, the compressed variation would at times be insufficient to control the combiner. The non-linear circuit 40 expands the compressed output power of the band-pass filter 39 sufficiently for control of the signal combiner. If a signal switching device is used as the signal combining means, the non-linear expander circuit is unnecessary. The noise amplifier 37 must be replaced with a signal amplifier if the supplied signals are not video signals but intermediate-frequency signals which are free from AGC operations.

As has been described, the control signal generator 30 of the invention can faithfully monitor, irrespective of the absolute values of the noise levels, which of the two noise levels is the larger and consequently can substantially completely eliminate the defects of the conventional control signal generator 10. Inasmuch as the gain of the amplifier 37 is controlled in response to the mean value of the two noise levels, the output control signals will not faithfully represent the absolute values of the noise levels but reliably represent which of the two noise levels is the higher. The generator 30 of the invention is therefore especially advantageous for use in conjunction with a signal switching device.

Figure 3:
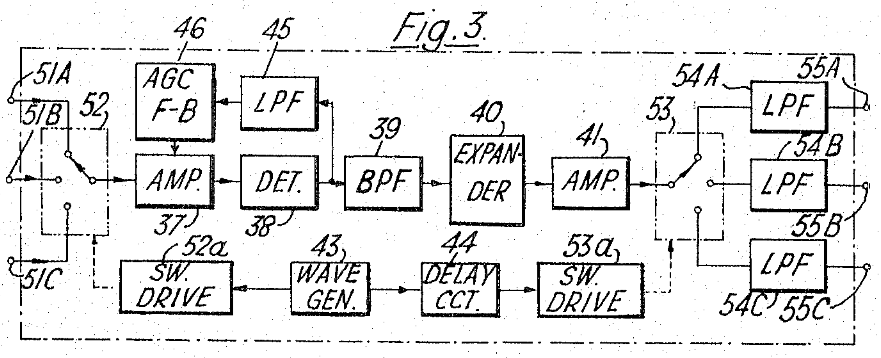
FIG. 3 is a block diagram of another embodiment of the invention.

Reference is made now to FIG. 3 which shows a control signal generator 50 for use in triple diversity, or in case transmission paths for the received signals are three. Elements which are similar to those in the generator 30 of FIG. 2 are illustrated with like reference numerals. Signal waves received through the three transmission lines are either demodulated or frequency-converted and then only the noise components are selected and supplied through three input terminals 51A, 51B, and 51C and an input switch 52 to the noise amplifier 37. The input switch 52 is electrically or mechanically driven by an input switch driving device 52a controlled by the output rectangular wave of the rectangular wave generator 43. An output switch 53 connected to the output of the auxiliary amplifier 41 is controlled by an output switch driving device 53a in a similar manner as the input switch 52. In order to maintain synchronism between operations of the input and the output switches 52 and 53 or in order that the output control signals obtained from the input signals supplied to the input terminals 51A, 51B, and 51C may be led to output terminals 55A, 55B, and 55C corresponding to the respective input terminals, respectively, the output power of the rectangular wave generator 43 is supplied through the delay circuit 44 to the output switch driving device 53a. The three output terminals of the switch 53 have connected thereto low-pass filters 54A, 54B, and 54C which are equivalent to the low-pass filter accompanying the directional rectifier contained in the output switch 42 of the control signal generator 30 and smooth the waveforms of the output control signals of the switch 53. The input and the output switches 52 and 53 are shown as if they were mechanically driven by the driving devices 52a and 53a only for convenience of illustration and may be replaced with electronic switches which are integrations of the switches 52 and 53 and the accompanying driving devices 52a and 53a. Also, the output switch 53, the driving device 53a, and the filters 54A, 54B, and 54C may be replaced with a three-output directional rectifier.

The control signal generator 50 produces at the output terminals 55A, 55B, and 55C in correspondence with the *S/N* ratios of the respective transmission lines three control signals, respectively, which represent the most desirable results of comparison when the *S/N* ratios of the singals received through such three transmission lines are approximately equal to one another. For the reason described in conjunction with the signal generator 30, the repetition frequency of the output rectangular wave of the rectangular wave generator 43 must be smaller than one-third of the frequency of the possible lowest-frequency component in the variation of the received signal waves, or the period for sampling by the recangular wave the signals supplied through the respective transmission lines and must be longer than one complete period of hte mentioned lowest-frequency component.

The control signal generator 50 is intended for triple diversity. Even if the order of the diversity is higher and may be quadruple or quintuple, it will be easy to provide a control signal generator for such high-order diversity by increasing the number of the input and the output terminals of the input and the output switches 52 and 53.

As has so far been explained, only one control signal extracting circuit is provided in a control signal generator of the invention in common to the signals received through a plurality of transmission paths so that the noise levels of such signals of the transmission lines may be compared with one another on the same reference basis. Moreover, the gain control common to the noise levels of the signals of the transmission lines makes it possible to represent the difference of the noise levels faithfully, however higher may be one of the levels than the remaining, however low the levels may be, or even if the levels may be of substantially the same.

While the invention has been described in conjunction with some embodiments and modifications, it is to be noted that the invention is not restricted to such but is widely adaptable. For instance, the concept of the invenion is applicable not only to the described diversity reception of a frequency-modulated wave but also to the diversity reception of an amplitude-modulated wave by comparing the signal levels instead of the noise levels.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A control signal generator for generating a plurality of control signals in response to the signal-to-noise ratios of a plurality of control signals, for controlling the combining peration of a diversity receiver combining means, comprising (a) an input switching device for successively applying signals from each of a given plurality of input paths to a common input of said generator, (b) processing means in said generator coupled to said common input for processing said applied signals to provide signals corresponding to the signal-to-noise ratios of said applied signals, (c) a common output for said processing means, (d) an output switching device having its input coupled to said common output and having said given plurality of output terminals, (e) a control wave generator for controlling said switching means in synchronism, and (f) low-pass filters connected to each of said plurality of output terminals to provide said control signals.

2. A control signal generator according to claim 1, wherein said processing means comprises an amplifier for said applied signals, and an automatic gain control circuit for said amplifier responsive to the sum of said applied signals.

3. A control signal generator according to claim 1, wherein said control wave generator is designed to produce control waves at least equal to the longest period of said applied signal divided by the number of input paths.

References Cited by the Examiner

UNITED STATES PATENTS 3,031,569 4/1962 Mandrel ---------- 325—305

WILLIAM C. COOPER, *Acting Primary Examiner.*

R. P. TAYLOR, *Assistant Examiner.*